Oct. 25, 1966

J. F. DONNELLY ETAL 3,280,700

PERISCOPIC REAR VIEW SYSTEM

Filed Dec. 6, 1962

INVENTORS
JOHN F. DONNELLY
ROGER D. JOHNSON
BY
Price & Heneveld
ATTORNEYS

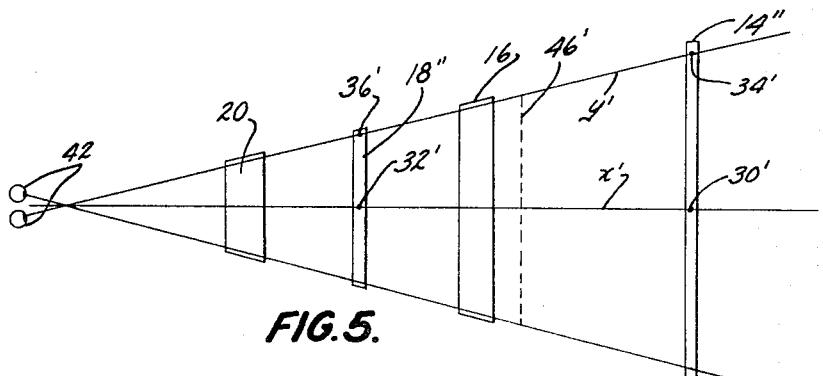
FIG. 5.
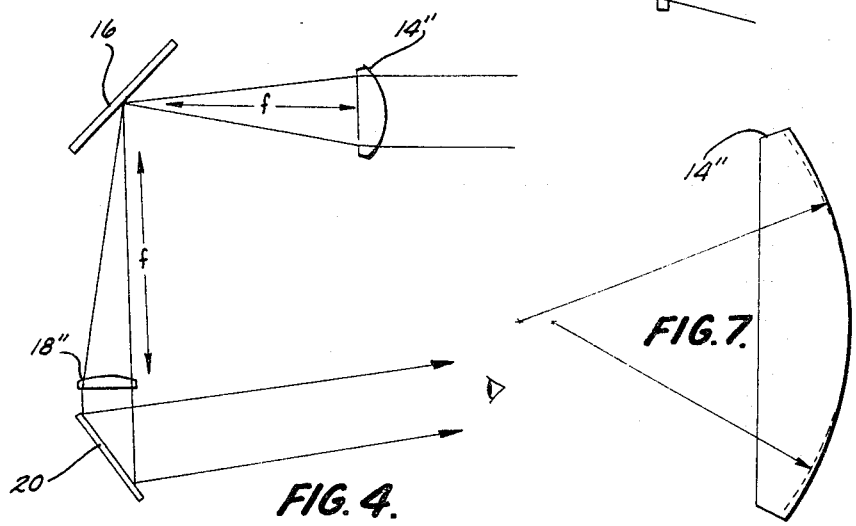
FIG. 4.
FIG. 7.
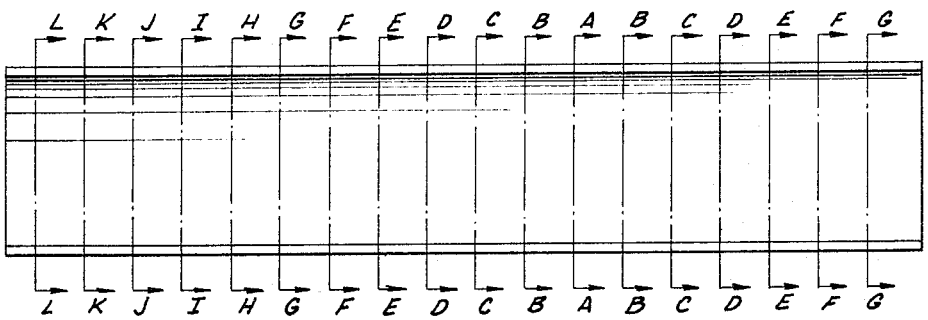
FIG. 6.

United States Patent Office 3,280,700
Patented Oct. 25, 1966

3,280,700
PERISCOPIC REAR VIEW SYSTEM
John F. Donnelly, Holland, and Roger D. Johnson, Zeeland, Mich., assignors to Donnelly Mirrors, Inc., Holland, Mich, a corporation of Michigan
Filed Dec. 6, 1962, Ser. No. 242,664
8 Claims. (Cl. 88—72)

This invention relates to rear view mirror systems for vehicles, and more particularly to a periscopic rear view mirror system providing wide angle vision with closely spaced optical elements, yet without image distortion.

Of the multitude and variety of periscopic rear view systems proposed for vehicles over the years, and especially in recent years, only a few have any real practical, commercial significance and potential for various reasons. Of these, a few such as those shown for example in the patents to Hyde 3,001,449 and 3,001,450 are capable of providing good rear vision, provided that the optical elements used are of limited width across the vehicle and are not closely spaced. The inventor and his coworkers for the assignee herein, have discovered after extensive research and experimentation that these rear view optical systems exhibit disturbing image distortion at the ends of the optical elements as soon as the width of the lens, especially the objective lens, is any considerable amount, and as soon as the elements are placed close together. As long as the lenses have long focal lengths and are spaced far apart, the distortion through the ends is not severe, although noticeable. With prior devices therefore, it is usually necessary to modify the vehicle body roof design considerably to receive the lens elements, and to mount the fragile optical elements at various locations in the vehicle from the roof to the dash. It should be understood that the "width" of the lens as used herein means the length of the lens across the width of the vehicle.

Therefore, it is the primary object of this invention to provide a rear view optical system, especially for vehicles, capable of employing lens elements in a closely spaced arrangement with resulting compactness, yet of any desired width across the vehicle, to thereby provide a lateral field of vision range of large scope, yet with no image distortion even at the ends of the optical elements. The system can therefore comprise a compact package unit which can be installed in vehicles without significant body changes. The elements can be largely enclosed into a package to be mounted adjacent the top of the windshield.

It is another object of this invention to provide a rear view system with a wide objective lens, wide vision range, and closely spaced optical elements which would normally exhibit severe distortion, but wherein complete compensation of the transmitted image from all portions of the lenses to the eyes is effected, to thereby provide distinct, clear rear vision. With the inventive system, the distance of the ray paths from any particular portion of the wide objective lens to the corresponding portion of a collimating lens is exactly controlled and made equal to the sum of the focal lengths of that portion of the objective lens from which the rays eminate and the corresponding portion of the collimating lens, thereby achieving perfect focus for all rays projected through the objective lens, the collimating lens, and eventually to the eyes of the vehicle driver.

These and other objects of this invention will be readily apparent upon studying the following specification in conjunction with the drawings in which:

FIG. 4 is a side elevational enlarged view of the second form of the inventive system;

FIG. 5 is an enlarged plan-type optical diagram of the apparatus in FIG. 4;

FIG. 6 is a front elevational view of the objective lens in the combination of FIGS. 4 and 5;

FIG. 7 is a side elevational enlarged view of the objective lens in FIG. 6;

Figure 1:
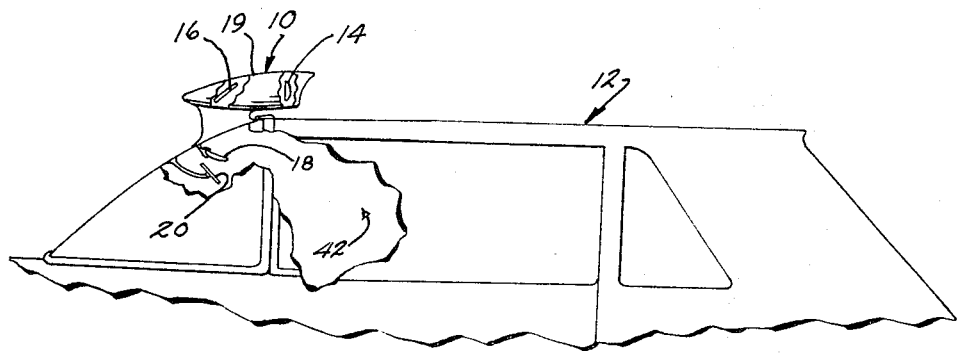
FIG. 1 is a fragmentary, side elevational, partially cutaway view of a typical form of the inventive optical system shown attached in a vehicle.

Basically, the inventive periscopic rear view system, especially in combination with a vehicle such as an automobile, is one having a wide field angle and closely spaced lens system which would conventionally exhibit great image distortion at the ends. It includes a wide objective lens positioned toward the area to be viewed, a collimating lens positioned to receive the image transmitted by the objective lens, optical reflecting elements in the form of an inverting mirror between the two lenses and an eye mirror to reflect the image into the eyes of the vehicle driver. The elements of this system having cooperable optical characteristics and physical spacing to cause the ray path distance of any selected ray from any portion of the objective lens to the corresponding portion of the collimating lens to be substantially equal in length to the sum of the focal length of the objective lens portion, and the focal length of the corresponding collimating lens portion. Often, the focal lengths will be the same so that the ray path distance between corresponding lens portions will be twice the focal length of either lens portion.

This is preferably achieved by providing controlled optical characteristics and physical arrangement of the two lens elements.

In the first form of the invention, this is achieved by providing the objective lens and one other element, preferably the collimating lens, with an arcuate construction across the width thereof to shorten the ray path distances increasing amounts towards the ends so that all ray path distances between any selected respective portions of the lenses is always equal to a fixed amount which is the sum of the focal length of the objective lens and the focal length of the collimating lens. The large radii of curvature of the bowed objective lens and collimating lens is equal to the optical distance from each respective lens to the position of the viewer's eye.

In the second form of the invention, correlation between the ray path distances between the lenses is controlled by providing a constantly varying and increasing focal length in the lenses towards the ends to cause the sum of the focal length of any particular portion of the objective lens plus the focal length of the corresponding collimating lens to be equal to the ray path distance between that portion of the objective and the corresponding portion of the collimating lens.

Referring now specifically to the drawings, the inventive system 10 is shown in a compact package form attached to and in combination with automobile 12. The system includes an objective lens 14, an inverting mirror 16, a collimating eye lens 18, and an eye mirror 20.

Figure 2:
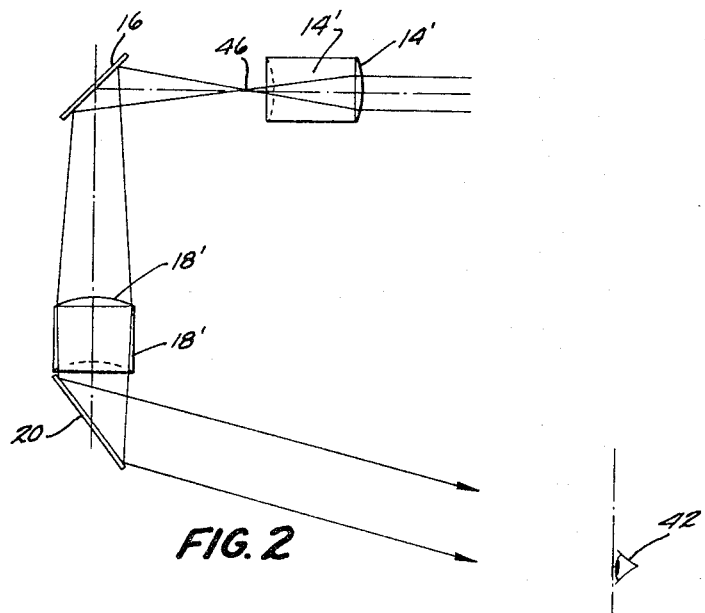
FIG. 2 is a side elevational enlarged view of the first form of the novel optical system.
Figure 3:
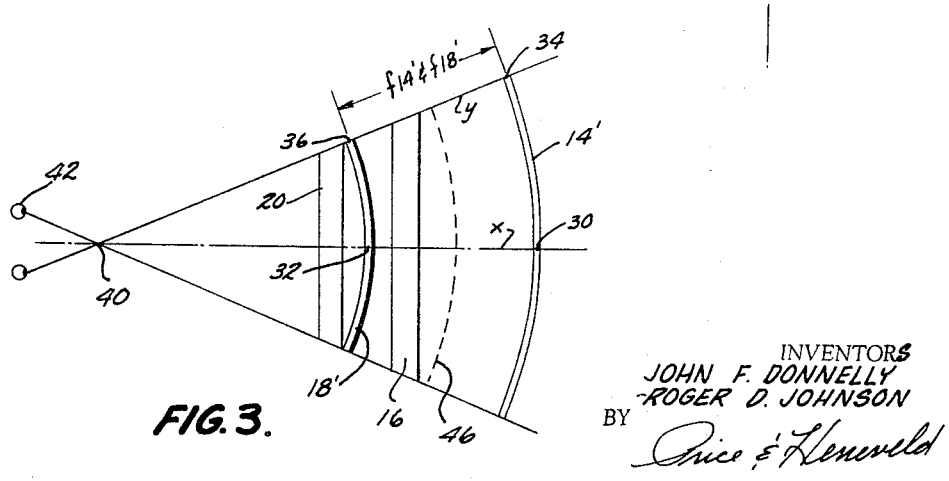
FIG. 3 is a plan-type optical diagram of the combination in FIG. 2 to show the optical arrangement provided thereby.

The combination as illustrated in FIG. 1 represents the first form of the invention in FIGS. 2 and 3, and also the second form of the invention in FIGS. 4 through 7.

The external components in the novel system may be mounted in a housing 19 attached adjacent the roof of the vehicle, either in front of the header bow (as shown) or behind the header bow using an opening (not shown) in the roof for the ray path. The field of vision can therefore be picked up by the objective lens to the rear of the vehicle. The receiving face of the objective lens toward the area or field to be viewed is convex from top to bottom to receive a large vertical field area. The back face, i.e. the face toward the front of the vehicle, may vary in configuration, but is preferably flat from top to bottom in the sense that a line from top to bottom would be substantially straight.

The lens focuses the rays of the field image, and transmits them to the inverting mirror 16, where they are reflected through the vehicle windshield unto collimating lens 18. The mirror is therefore positioned diagonally downwardly and toward the rear of the vehicle.

In the invention as shown in FIG. 1, the objective lens is mounted in the rear of the housing, the inverting mirror is mounted in the top front corner thereof, and the collimating lens is mounted adjacent the bottom of the housing by any suitable bracket means.

Collimating lens 18 has a convex curvature across its breadth substantially like that of objective lens 14 to properly receive the image from lens 14 and collimate the rays for optimum viewing after they are reflected from eye mirror 20. Mirror 20 may be pivotally attached for accommodating drivers of different height. The mirror bracket may be secured to the windshield, or may be mounted in any other suitable manner. Eye mirror 20 is oriented toward the rear of the vehicle and may be tilted at various angles diagonally depending upon its specific location with respect to the specific driver's eyes.

The preferred system therefore comprises four optical elements—two similar lenses, and two reflecting mirrors to orient the rays into the driver's eyes. For explanatory reasons, it will be noted that the housing may be approximately 16–25 inches or so long across the width of the vehicle, may be 12–16 inches deep from front to back along the top, and may be 8–12 inches high along the front. The top and front are roughly rectangular. Thus, it will readily be noted that the lenses extending across the width or length of the housing are very wide, and are closely spaced.

In the first form of the invention illustrated in FIGS. 2 and 3, the mirror elements 16 and 20 are conventional flat mirrors. This is also true in the second form of the invention illustrated in FIG. 4. The difference between the first and second forms of the invention lies in the construction and arrangement of the lens elements 14' and 18' in the first form, and 14'' and 18'' in the second form of the invention.

As mentioned previously, the basic problem with rear view optical lens systems heretofore is that they were limited to a small width across the vehicle, and relatively large spacing and large focal lengths, since otherwise optical distortion from rays passing through the ends of the lenses was very great. This was found to be the result of unequal ray path distance from portions of the linear-axis objective lens to corresponding portions of the linear-axis eye or collimating lens. For perfect focus, optical distance for all ray paths from the objective lens to the collimating lens should be the sum of the focal length of the objective lens plus the focal length of the collimating lens. Since the conventional lenses have a straight line axis, however, if the spacing between the centers of the two spaced lenses is equal to the sum of the focal lengths, the ray path distance from the ends of the lenses is much greater than this. Therefore, the image portions passing through the ends were out of focus and distorted.

The solution to the problem, and therefore the chief object of the present invention is to provide an optical system whereby the optical length of the ray paths from any portion of the objective lens, even the ends, to the corresponding portion of the collimating lens is always equal to the sum of the focal length of that portion of the objective lens plus the focal length of the corresponding portion of the collimating lens. Thereby, perfect focus will be achieved over the entire length or width of the lens, no matter how wide it is, or how closely spaced the lens. Normally, the focal lengths of these corresponding portions are equal so that unit magnification is achieved. In this instance the ray path distance will be twice the focal length of either lens portion. Since the magnification can be varied from about 0.7 to about 1.1 without eye discomfort, the focal lengths may be different.

For purposes of convenience in explanation, the ray traces in FIGS. 2 and 3 will be identified with the lower case letters "$x$" and "$y$". Normally, the ray path distance $x$ from the center portion 30 of objective lens 14' to a corresponding center portion 32 of collimating lens 18' after reflection from mirror 16, will be shorter than the ray path distance from end portion 34 of lens 14' to corresponding end portion 36 of lens 18'. Thus, if the distance $x$ is set to equal the sum of the focal lengths of the lens portions by specific arrangement of the lens, distance $y$ will be greater than the sum of the focal lengths.

In the first form of the invention, the objective lens is purposely bowed from end to end, i.e. made arcuate laterally about a vertical axis. It has a radius of curvature equal to the optical distance between the lens and the position of the eyes 42. (It will be understood that the crossing point 40 is closely adjacent the eyes 42.) Thus, the imaginary line of focus 46 of all rays through objective lens 14' is curved accordingly. To cause the distance $y$ between the lenses to be equal to the sum of the focal lengths of that particular objective lens portion and the corresponding collimating lens portion, and to also cause the distance $x$ between the lenses to equal the focal length of that particular objective lens portion 30 plus the focal length of the corresponding eye lens, the eye lens is also curved or bowed in a similar manner so that $x$ equals $y$. Thus, by properly locating the lenses, $x=y=f_{14'}+f_{18'}$, i.e., the path length for all rays eminating from lens 14' to corresponding portions of lens 18' are equal to each other and equal to the sum of the focal lengths of the lens. This may be twice the focal length of either lens if $f_{14'}=f_{18'}$.

All rays are then in proper focus. Lens 18' then collimates the rays, which are reflected from eye mirror 20 into driver's eyes 42.

Before bowing, the lenses are each plano-convex. They are preferably bowed on the plane surface. Therefore, the convex surface of the eye lens 18' will be up in the preferred form of the invention. The same clear image of the same magnification will be seen regardless of whether the driver sits closer to or further from mirror 20. It accommodates tall or short drivers by simple adjustment of mirror 20. With this system, all portions of the image are in perfect focus, and no distortion occurs from the ends of the lenses even though the lenses are very wide and encompass a large field and are relatively closely spaced with respect to each other.

Figure 8:
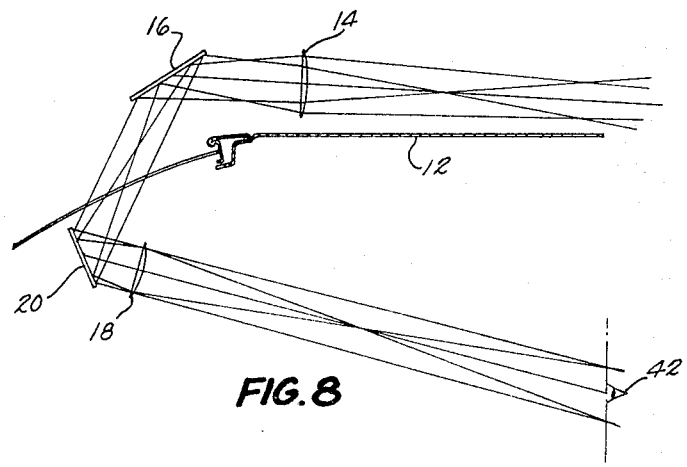
FIG. 8 is a side elevational view of the inventive system with the collimating lens rearranged.
Figure 9:
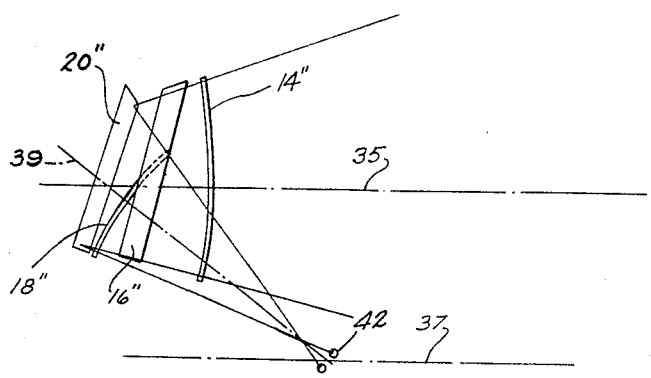
FIG. 9 is a plan view of the first form of the inventive system showing the lenses and mirrors mounted adjacent the centerline of the vehicle and oriented toward the driver on one side thereof.
Figure 10:
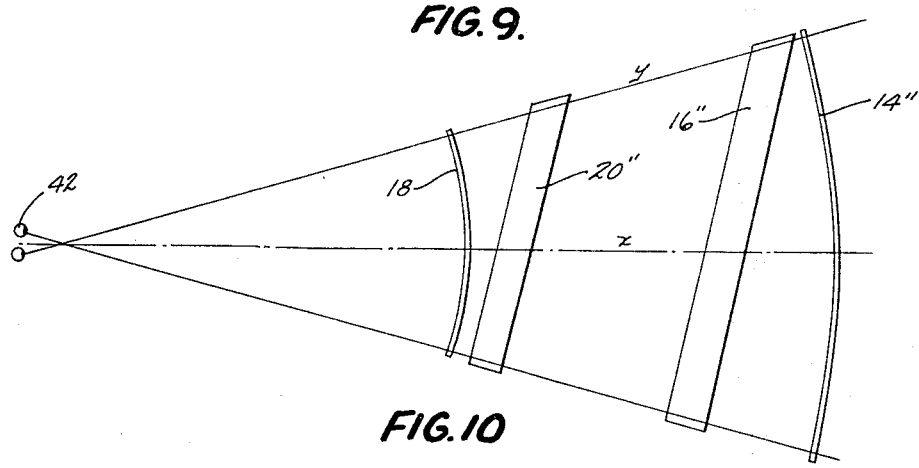
FIG. 10 is a plan-type optical diagram of the apparatus in FIG. 9.

In FIG. 3, the first form of the invention is shown optically in its simplest form for explanatory purposes. It will be understood that such an optical diagram represents the system located on the centerline of the driver, i.e. parallel to the centerline of the vehicle. In FIGS. 9 and 10, the lens system is located generally on the vehicle centerline. Specifically, the objective lens 14'' is exactly on the vehicle centerline 35, inverting mirror 16'' is tilted slightly toward the driver centerline 37 parallel to centerline 35, eye mirror 20'' is tilted more yet, and eye or collimating lens 18'' is on a centerline 39 between the driver's eyes 42 and the vehicle centerline 35. The collimating lens performs exactly the same function as before, but is located to receive the rays after they leave the eye mirror, as shown in elevation in FIG. 8. The optical ray path length from the objective lens to the collimating lens will still be the same over the entire length of the lenses and will equal the sum of the focal lengths. The new position of the collimating lens merely saves a little overhead space. The side tilting of the elements merely allows them to be placed near the center of the vehicle to obtain a larger panoramic rear vision. The diagrammatic ray trace correlation is shown in FIG. 10 where it can be seen that $x = y = f_{14''} + f_{18''}$. Thus, the principles, and the basic system is the same with only slight variation for practical reasons.

In the second form of the invention, illustrated in FIGS. 4 through 7, instead of controlling the distance between the lenses in respect to the focal lengths, the focal lengths are controlled in respect to the distances between the respective corresponding portions of the lenses. Thus, referring to FIG. 5, objective lens 14″ is basically a convex lens directed toward the field to be viewed behind the vehicle, and is formed on a straight axis across the width of the vehicle. Collimating lens 18″ is similarly formed. These cooperate with mirrors 16 and 20 to control the passage of light rays to eyes 42. Since it is important that the ray path distance from any particular portion of the objective lens to the corresponding portion of the collimating lens be equal to the sum of the focal lengths of these particular portions, this is achieved by constantly varying the focal lengths of the lenses from the center to the ends. Thus, the focal length portion 34′ at the end of objective lens 14″ is substantially larger than the focal length of portion 30′ in the center of the objective lens. Also, the focal length of portion 36′ at the end of the collimating lens 18″ is substantially larger than that of portion 32′ in the center of the collimating lens. Thus, if a series of vertical sections were taken from the center or near center of either lens, for example, the objective lens as shown in FIG. 6, the radius of curvature of the front face of the lens gradually increases from a small value in the center to a larger value at the ends, while the correspondingly small focal length in the center is constantly increasing to larger focal lengths toward the ends. Typical values for an objective lens having a height of about 3 inches are as follows:

| Section: | Radius, inches |
| --- | --- |
| A–A | 2.305 |
| B–B | 2.308 |
| C–C | 2.310 |
| D–D | 2.323 |
| E–E | 2.343 |
| F–F | 2.365 |
| G–G | 2.390 |
| H–H | 2.415 |
| I–I | 2.445 |
| J–J | 2.485 |
| K–K | 2.525 |
| L–L | 2.570 |

Obviously, these figures are exemplary and not limiting in nature. It will also be noted that the smallest radius of curvature may be located off-center from the true physical center. This is due to the position of the driver at one side of the vehicle rather than in the center of the vehicle, whereas the lens system is basically centered on the centerline of the vehicle. This, of course, may be varied depending upon the positioning of the lens system with respect to the driver. The eye lens focal length is varied similarly.

The radius of curvature and the corresponding focal length is not randomly changed, but is changed exactly to cause the sum of the focal length of an objective lens portion and the specific focal length of the corresponding collimating lens portion to equal the ray path distance between the respective objective lens portion and corresponding collimating lens portion. Thus, for example, the glass lens is formed so that the focal length of portion 34′ of objective lens 14″ plus the focal length of portion 36 of collimating lens 18″ equals the ray path distance $y'$ from portion 34′ to portion 36′. Likewise, the focal length of portion 30′, in the center of the objective lens plus the focal length of portion 32′ equals the ray path distance $x'$ from portion 30′ to portion 32′. In other words, the imaginary line of focus 46′ would be a straight line halfway between the lenses. Thus, the ray distance $x'$ or $y'$ from any particular portion of the wider objective lens to any corresponding portion of the narrower collimating lens will always be equal to the sum of the focal lengths of those particular lens portions, no matter what the width of the lenses and the close spacing thereof. The convex face of lens 18″ is preferably faced downwardly, but may also be upwardly without greatly effecting the system. All image rays passed to the eye 42 will be in perfect focus due to this relationship. Consequently, even though the lens elements are closely spaced, and project a vision field of great scope, no distortion will occur at the ends of the lens system. This enables the entire system to be compactly arranged and neatly attached in an attractive manner without any major body modification on the vehicle.

It will, of course, be understood that the second form of the invention may also be located on the centerline of the vehicle instead of directly in front of and above the driver, providing the arrangement of elements and the focal length variations are provided in exact manner to cause the ray path distance to equal the sum of the corresponding focal lengths.

It will be obvious that these two closely related system for providing undistorted rear view vision over a wide field with closely spaced elements, capable of formation into a packaged attachment unit may be varied slightly within the principles taught without departing from the invention. The principles may be applied to longer focal length systems developed heretofore, for example, with improved results occurring. These obvious modifications are therefore deemed to be part of this invention, which is to be limited only by the scope of the appended claims and the reasonably equivalent structures to those defined therein.

We claim:

1. In a periscopic rear view system for a vehicle having a wide angle of view including an optical path and having an elongated objective lens element positioned toward the area to be viewed; an elongated collimating lens element being spaced from said objective lens and positioned to receive the image transmitted by said objective lens element to collimate the rays for viewing by a user; said lenses having their axes of elongation parallel and located in mutually parallel planes, optical ray reflecting elements located in said path to change the direction of the light rays toward the eyes of the user; said system normally exhibiting considerable distortion of image portions transmitted through the ends of said lenses, the improvement comprising: said lens elements and reflecting elements having cooperative focal characteristics and spacing to cause the ray path distances between said lens of all angularly separated rays passing normally through the surface and the zero power meridian of each of the respective lens to be substantially equal to the sum of the focal lengths of the portions of the lens through which each of said rays pass, said rays intersecting at the normal position of the user's eye.

2. The system of claim 1 in which each of said lens elements has one substantially planar surface which is parallel to the planar surface of the other whereby the length between said lenses of said rays transmitted through the end portions of said lens are greater than the lengths of said rays transmitted through the center portions of said lens; such ray lengths being compensated for by providing at least one of said lenses with end portions of correspondingly greater focal lengths.

3. The system of claim 2 in which both of said lenses have focal lengths steadily increasing from the center to the ends thereof.

4. The system of claim 1 in which an inverting mirror is located in said path between said objective and collimating lenses and an eye mirror is located in the path of the rays collimated by said collimating lens.

5. The system of claim 2 in which an inverting mirror is located in said path between said objective and collimating lenses and an eye mirror is located in the path of the rays collimated by said collimating lens.

6. In a periscopic rear view system for a vehicle providing a wide angle of view including an elongated objective lens element position toward the area to be viewed; an elongated collimating lens element spaced from said objective lens and positioned to receive the image transmitted by said obective lens to collimate the rays for viewing by a user; mirror elements positioned in the optical path to reflect the light rays toward the eyes of said user; said system normally exhibiting considerable distortion of image portions transmitted through the ends of said lenses, the improvement comprising: said objective lens and said collimating lens being cylindrically curved in the zero power meridian and concentrically arranged on respective curves from end to end with the common center of curvature of said lenses being located at the intercept of two angularly separated rays passing normal to the surface in the zero power meridian of each of the respective cylindrical lenses, such center of curvature serving at the usual position of the user's eyes; the ray path distance between said lenses for all such rays being substantially equal to each other and equal to substantially the sum of the focal lengths of the lenses.

7. The system of claim 6 in which an inverting mirror is located in said path between said objective and collimating lenses and an eye mirror is located in the path of the rays collimated by said collimating lens.

8. The system of claim 6 in which an inverting mirror and an eye mirror are located in said path between said lenses.

References Cited by the Examiner

UNITED STATES PATENTS

| | | | |
|---|---|---|---|
| 3,001,450 | 9/1961 | Hyde | 88—70 |
| 3,073,215 | 1/1963 | Fischer | 88—57 |

JEWELL H. PEDERSEN, *Primary Examiner.*

RONALD L. WIBERT, *Examiner.*